(12) United States Patent
Besnard et al.

(10) Patent No.: US 8,287,413 B2
(45) Date of Patent: Oct. 16, 2012

(54) DEVICE FOR TRANSMITTING POWER BETWEEN THE OUTPUT OF A THERMAL ENGINE AND A WHEEL SHAFT, AND USE OF SAID DEVICE

(75) Inventors: Sebastien Besnard, Bourg la Reine (FR); Carlos Junca, Paris (FR); Aurelien Renault, Elancourt (FR); Nicolas Robart, Issy les Moulineaux (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 372 days.

(21) Appl. No.: 12/738,981

(22) PCT Filed: Nov. 7, 2008

(86) PCT No.: PCT/FR2008/052012
§ 371 (c)(1),
(2), (4) Date: Apr. 20, 2010

(87) PCT Pub. No.: WO2009/068796
PCT Pub. Date: Jun. 4, 2009

(65) Prior Publication Data
US 2010/0320017 A1 Dec. 23, 2010

(30) Foreign Application Priority Data
Nov. 7, 2007 (FR) ...................................... 0758834

(51) Int. Cl.
*F16H 3/72* (2006.01)
(52) U.S. Cl. ............................................................ 475/5
(58) Field of Classification Search ............... 475/5, 149, 475/150, 207, 220, 198; 310/71, 98
See application file for complete search history.

(56) References Cited

U.S. PATENT DOCUMENTS

| 6,159,127 | A   | 12/2000 | Loeffler et al. |
| 6,340,847 | B1  | 1/2002  | Kawabata et al. |
| 6,656,082 | B1  | 12/2003 | Yamada et al. |
| 6,849,017 | B2* | 2/2005  | Nett .................................. 475/5 |
| 7,980,980 | B2* | 7/2011  | Rask et al. ......................... 475/5 |

(Continued)

FOREIGN PATENT DOCUMENTS

| EP | 1026023 | A2 * | 8/2000 |
| EP | 1092581 | A2 * | 4/2001 |
| EP | 1092583 | A1 * | 4/2001 |
| FR | 2832357 | A1 * | 5/2003 |

(Continued)

OTHER PUBLICATIONS

International Search Report of PCT Appl. No. PCT/FR2008/052012 mailed May 8, 2009.

*Primary Examiner* — David D Le
*Assistant Examiner* — Stacey Fluhart
(74) *Attorney, Agent, or Firm* — Nicolas E. Seckel (57) ABSTRACT

The invention relates to a power transmission device (1.1) that comprises an input shaft (2) to be connected to a thermal engine (3) and an output shaft (4) to be connected to a wheel shaft (5). The device (1.1) includes first and second electric machines (6, 7) and a mechanical assembly (12) ensuring the mechanical link between the input shaft, the output shaft and the shafts (8, 9) of the machines (6, 7). According to the invention, in order to limit the use of the epicyclic gear trains, at least one of the electric machines (8, 9) comprises a rotor (6.1) and a stator (6.2) connected to the mechanical assembly (12).

20 Claims, 5 Drawing Sheets

U.S. PATENT DOCUMENTS

| | | | |
|---|---|---|---|
| 8,047,321 B2 * | 11/2011 | Martini et al. | 180/220 |
| 2005/0064974 A1 | 3/2005 | Bezian et al. | |
| 2008/0103002 A1 * | 5/2008 | Holmes | 475/5 |
| 2008/0227576 A1 | 9/2008 | Besnard et al. | |

FOREIGN PATENT DOCUMENTS

| | | | |
|---|---|---|---|
| FR | 2834248 A1 | * | 7/2003 |
| FR | 2834938 A1 | * | 7/2003 |
| FR | 2883515 A1 | * | 9/2006 |

* cited by examiner

ETAT DE LA TECHNIQUE

DEVICE FOR TRANSMITTING POWER BETWEEN THE OUTPUT OF A THERMAL ENGINE AND A WHEEL SHAFT, AND USE OF SAID DEVICE

The present invention concerns a device for transmitting power between an output of a heat engine and a wheel shaft, as well as the use of said device. A particular purpose of the invention is to limit the overall size and the cost of such a device. The invention has a particularly advantageous, but not exclusive application in the field of power-split hybrid motor vehicles.

As shown in FIG. 1, a power-split transmission device 1 comprises an input shaft 2 connected to a mechanical power source 3 (typically a heat engine) and an output shaft 4 connected to the wheels 5 of the vehicle. This device 1 comprises two electric machines 6, 7 connected to one another through an electrical system 11, and a mechanical assembly 12 providing the connection between the power source 3, the vehicle wheels 5, and the two electric machines 6, 7.

The power from the source 3 is either transmitted to the wheels 5 or split to the electric machines 6, 7, which are capable of operating as motors or as generators, depending on levels of electrical and/or mechanical energies respectively received at their terminals and on their shafts. The split power is retransmitted to the vehicle wheels 5 or stored, if applicable, in a battery connected to the electrical system.

This split power makes it possible to accurately adjust the torque applied to the vehicle wheels 5 to match the torque requested by a driver, and at the same time accurately adjust the torque and speed of the heat engine as well, so as to optimize its efficiency.

Most proposed transmission devices, such as those described in French patent applications FR-A-2832357 and FR-2883515, comprise a mechanical assembly 12 made up of one, two or more planetary gear trains connected to one another.

The invention proposes limiting the use of planetary gear trains, which are mechanical elements that are complex to design and build.

To this end, the invention consists in replacing the machines whose rotor is connected to the planetary gear train and whose stator is connected to the transmission housing with machines comprising rotating rotors and stators connected to the transmission input and output.

From an operational standpoint, the two types of architecture are identical. Moreover, the functional dimensioning of the electric machines is equivalent for transmissions with and without planetary gear trains. However, the gear reductions between the machines and the input and output shafts are preferably modified.

The significance of the invention is economic in nature, as the elimination of one or more planetary gear trains in a power-split transmission substantially reduces the manufacturing cost of the transmission device. In addition, by eliminating at least one planetary gear train of the mechanical assembly, its overall size is reduced.

The invention thus relates to a power transmission device comprising an input shaft intended to be connected to a heat engine and an output shaft intended to be connected to a wheel shaft, said device additionally comprising:

a first and a second electric machine, and a mechanical assembly providing the mechanical connection between the input shaft, the output shaft, and the machine shafts, characterized in that at least one of the electric machines comprises rotating rotor and stator connected to the mechanical assembly, and in that it additionally comprises a switching device mounted on the shaft of one of the electric machines, this switching device enabling the machine shaft to be selectively connected to two different elements of the mechanical assembly in order to change the operating mode of the power transmission device.

According to an embodiment, the rotational speed of the electric machine that carries the switching device is proportional solely to the rotational speed of the wheels or of the engine when the shaft of said machine is connected to one of the two elements of the mechanical assembly, and the rotational speed of the electric machine that carries the switching device is dependent on the rotational speeds of the wheels and of the engine when the shaft of said machine is connected to the other element of the mechanical assembly.

According to an embodiment, with both electric machines having rotating stators, the mechanical assembly is entirely without a planetary gear train.

According to one of the embodiments, with one of the machines having a rotating stator and the other a fixed stator, the mechanical assembly comprises only one planetary gear train, made up of a sun gear, a planet carrier with planet gears, and a ring gear that intermesh.

According to an embodiment, the input shaft is directly connected to the planet carrier, and the output shaft is connected to an intermediate shaft via a differential with a ratio of $\mu 1$, said intermediate shaft being connected to the ring gear via a gear assembly with a ratio of $\mu 0$.

According to an embodiment, the shaft of the machine with the fixed stator is selectively connectable to the ring gear via a gear assembly with a ratio of r2, or to the sun gear via a gear assembly with a ratio of r3.

According to an embodiment, the stator of the machine with the rotating stator is connected to the input shaft via a gear assembly with a ratio of q2, and the rotor of the machine with the rotating stator is connected to the sun gear via a gear assembly with a ratio of q1.

According to an embodiment, $\mu 0=-0.15$; $\mu 1=-1.65$; r2=−0.25; r3=−0.89; q1=−0.26; q2=−0.50.

According to an embodiment, the output shaft is connected to an intermediate shaft via a differential with a ratio of $\mu 1$, said intermediate shaft being connected in turn to the input shaft via a gear assembly with a ratio of $\mu 0$.

According to an embodiment, the rotor of the first machine is connected to the wheels via a gear assembly with a ratio of q1, and the stator of this machine is connected to the input shaft via a gear assembly with a ratio of q2.

According to an embodiment, the rotor of the second machine is selectively connectable to the output shaft via a gear assembly with a ratio of r2 or via a gear assembly with a ratio of q3, respectively by means of a first dog clutch and a second dog clutch, the stator of this second machine being selectively connectable to the input shaft via a gear assembly with a ratio of q4 or to the fixed frame, respectively by means of a third dog clutch and a fourth dog clutch.

According to an embodiment, $\mu 0=-0.15$; $\mu 1=-1.65$; r2=−0.25; r3=−0.89; q1=−0.26; q2=−0.50; q3=0.49; q4=0.32.

The invention additionally relates to the use of the device according to the invention, characterized in that:

in a coupled-output type of operating mode, the first and fourth dog clutches are closed, and the second and third dog clutches are opened, and in a combined mode, the second and third dog clutches are closed, and the first and fourth dog clutches are opened.

According to an implementation, in order to change from coupled-output mode to combined mode, the first dog clutch is disengaged while the fourth dog clutch remains engaged, the rotational speed of the second machine rotor is synchronized with an idler gear connectable to the second dog clutch, then this second dog clutch is engaged, the fourth dog clutch is disengaged, the rotational speed of the stator of the machine with the gear connectable to the dog clutch is synchronized, and the dog clutch is engaged with this gear.

According to an implementation, in order to change from combined mode to coupled-output mode, the third dog clutch is disengaged and the second machine stator is stopped so as to engage the fourth dog clutch with the gear associated with it, and the second dog clutch is opened, the second machine rotor is synchronized with the gear connectable to the first dog clutch, and the first dog clutch is engaged with this gear.

The following description and accompanying figures will make the invention more easily understood. These figures are given as an illustration, and are in no way an exhaustive representation of the invention. These figures show.

Identical elements retain the same reference from one figure to another.

On the left side, FIG. 2 show kinematic diagrams of prior art single-mode-type power transmission devices, which have only one possible transmission configuration, i.e., only one operating mode.

On the right side, FIG. 2 show kinematic diagrams of equivalent transmission devices according to the invention, in which the planetary gear trains have been replaced by an electric machine with a rotating stator and a gear reduction.

Figure 1:
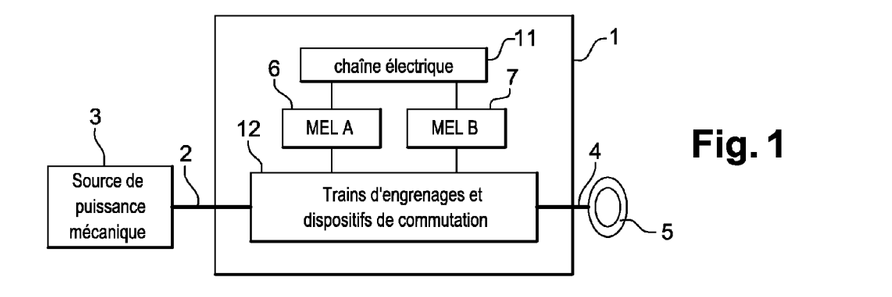
FIG. 1 (already described): a schematic representation of the architecture of a power-split transmission device.
Figure 2A:
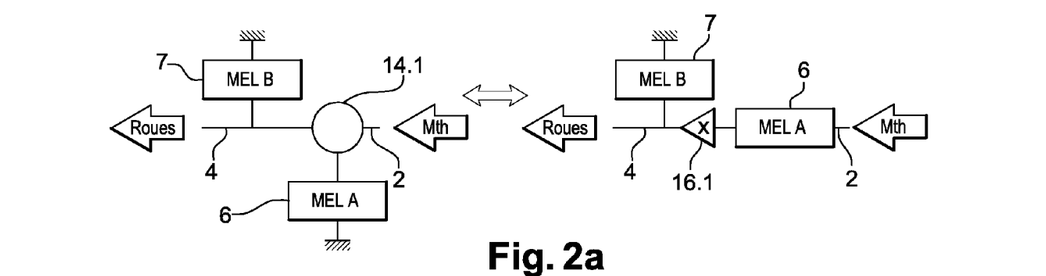
FIG. 2: kinematic diagrams of prior art single-mode transmission devices and their equivalent according to the invention.

More precisely, FIG. 2a shows a coupled-output architecture on the left, in which the shafts of the electric machines 6, 7 (with fixed stators) are connected to the planetary gear train 14.1 and to the output shaft 4, respectively. This architecture is known as "coupled output" because the rotational speed of the machine 7 is directly proportional to the rotational speed of the output shaft 4.

In the equivalent diagram according to the invention shown on the right, the assembly made up of the fixed-stator electric machine 6 and the planetary gear train 14.1 has been replaced by an assembly made up of an electric machine 6 and a gear reduction 16.1.

Figure 2B:
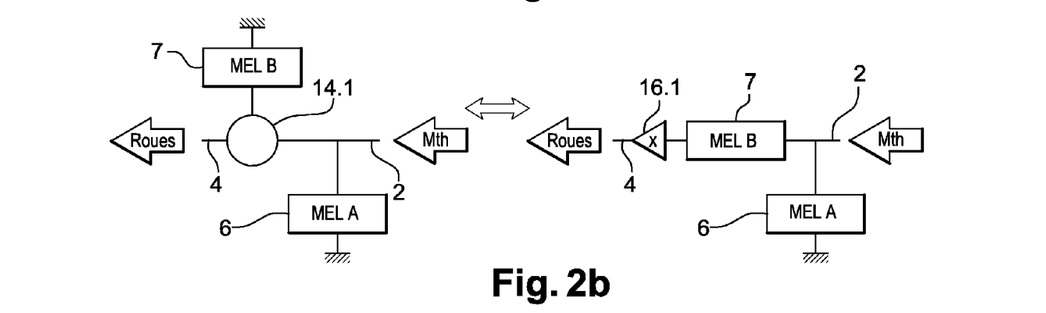

FIG. 2b shows a conventional coupled-input architecture on the left, in which the shafts of the electric machines 6 and 7 (with fixed stators) are connected to the input shaft 2 and the planetary gear train 14.1, respectively. This architecture is known as "coupled input" because the rotational speed of the machine 6 is directly proportional to the rotational speed of the input shaft 2.

In the equivalent diagram according to the invention shown on the right, the assembly made up of the fixed-stator electric machine 7 and the planetary gear train 14.1 has been replaced by an assembly made up of a rotating-stator electric machine 7 and a gear reduction 16.1.

Figure 2C:
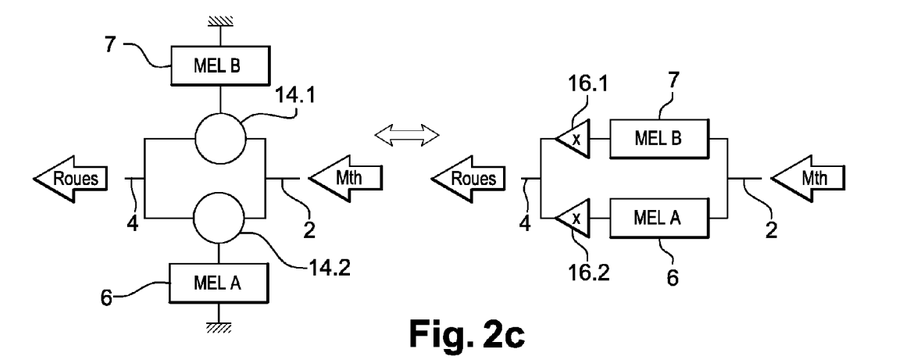

FIG. 2c shows a combined-type architecture on the left, in which the electric machines 6 and 7 (with fixed stators) are connected to the input shaft 2 and to the output shaft 4, each one via a planetary gear train 14.1, 14.2. This architecture is called a combined type because the rotational speeds of the machines 6, 7 is dependent on the rotational speeds of the input 2 and output 4 shafts.

In the equivalent diagram according to the invention shown on the right, the fixed-stator electric machines 6 and 7 and the planetary gear trains 14.1, 14.2 have been replaced by rotating-stator electric machines 6, 7 and a gear reduction 16.1, 16.2 connected in parallel.

The above-described way of simplifying single-mode architectures, which consists in replacing planetary gear trains with a rotating stator and a gear reduction, can be extended to multi-mode transmission devices in which a machine shaft is connectable to two different elements of the mechanical assembly. Such systems have the advantage of reducing the power split to the electrical system by enabling the electric machine to be connected to whichever of the two elements is rotating at the slowest rate.

FIGS. 3 thus show kinematic diagrams of prior art multi-mode transmissions, wherein the two fixed-stator electric machines 6, 7 are connected to one another via two planetary gear trains 14.1, 14.2, whereas FIGS. 4 show diagrams of transmissions according to the invention, equivalent to those in FIGS. 3, in which the planetary gear trains have been replaced by machines 6, 7 with rotating stators and rotors, and gear reductions connected in parallel.

Figure 3A:
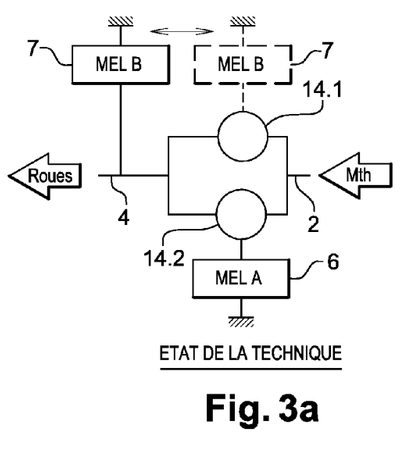
FIG. 3: kinematic diagrams of prior art multi-mode transmission devices.

More precisely, FIG. 3a shows a kinematic diagram of a prior art transmission operable in a coupled-output type of mode and a combined mode. In the coupled-output mode, the machine 7, drawn in solid lines, is connected directly to the output shaft 4, while in combined mode, the machine 7, drawn in dashed lines, is connected to the planetary gear train 14.1.

Figure 4A:
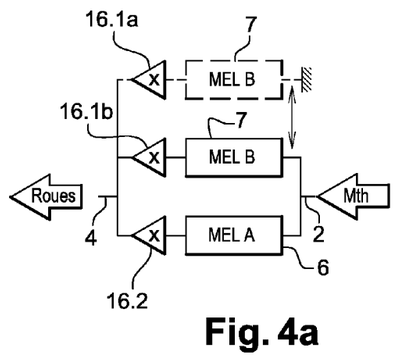
FIG. 4: kinematic diagrams of multi-mode transmissions according to the invention, equivalent to those in FIG. 3, with no planetary gear trains.

FIG. 4a shows a kinematic diagram of an equivalent transmission according to the invention, in which the planetary gear trains 14.1, 14.2 have been replaced by two rotating-rotor and -stator machines 6, 7 and gear reductions 16.1, 16.2. In coupled-output mode, the stator of the machine 7, shown by a dashed line, is connected to the housing, with a gear reduction 16.1a connected at the output of the machine 7. In combined mode, the stator of the machine 7, shown by a solid line, is connected to the input shaft 2, with a gear reduction 16.1b (different than 16.1a) connected at the output of the machine 7. A switching device mounted on the shaft of the machine 7 is responsible for switching from one mode to the other.

Figure 3B:
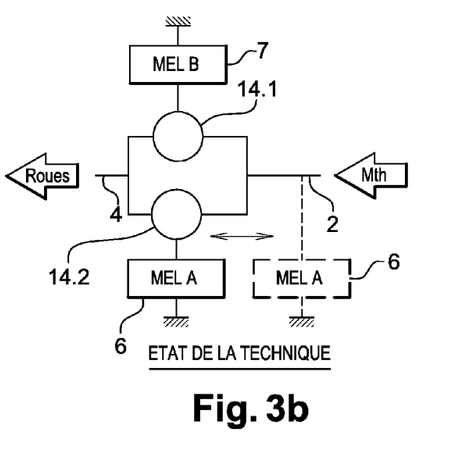

FIG. 3b shows a kinematic diagram of a prior art transmission operating in a coupled-input type of mode and a combined mode. In coupled-input mode, the machine 6, shown by a dashed line, is directly connected to the input shaft 2. In combined mode, the machine 6, shown by a solid line, is connected to the planetary gear train 14.2.

Figure 4B:
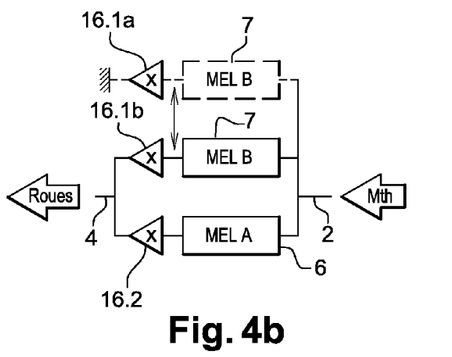

FIG. 4b shows a kinematic diagram of an equivalent transmission according to the invention, in which the planetary gear trains 14.1, 14.2 have been replaced by two rotating-rotor and -stator machines 6, 7 and gear reductions 16.1, 16.2. In the coupled-input mode, the stator of the machine 7, shown by a dashed line, is connected to the housing, with a gear reduction 16.1a connected at the output of the machine 7. In combined mode, the stator of the machine 7, shown by a solid line, is connected to the output shaft 4, with a gear reduction 16.1b (different than 16.1a) connected at the output of the machine 7. A switching device mounted on the shaft of the machine 7 is responsible for switching from one mode to the other.

Figure 4C:
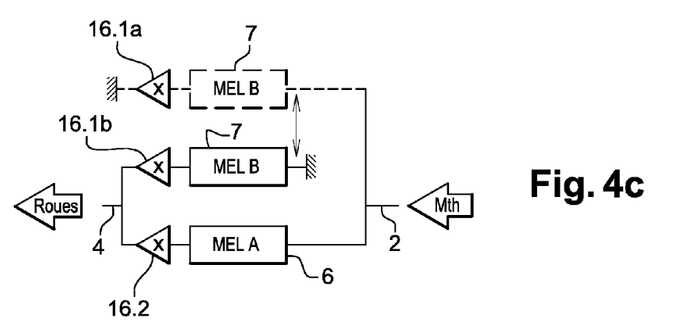

FIG. 4c shows a kinematic diagram of a coupled-input and -output transmission according to the invention. In coupled-input mode, the stator and the rotor of the machine 7, shown by a dashed line, are respectively connected to the housing and to the input shaft 2, with a gear reduction 16.1a connected at the output of the machine 7. In coupled-output mode, the stator and the rotor of the machine 7 are respectively connected to the housing and to the output shaft 4, with a gear reduction 16.1b (different than 16.1a) connected at the output of the machine 7. A switching device mounted on the shaft of the machine 7 is responsible for switching from one mode to the other.

However, in the case where two rotating-stator machines 6, 7 are used, the mechanical synchronization of the connecting elements for changing from one mode to the other is no longer guaranteed at the moment the coupling mode changes, and each of the shafts must be synchronized before changing modes.

FIG. 5 show diagrams of the inventive transmission, equivalent to those in FIG. 3, which make it possible to keep the proper synchronization of the transmission. To this end, one replaces the planetary gear train connected to the machine with which no mechanical reconfiguration is performed, and one keeps the planetary gear train connected to the machine that implements the change of mode.

Figure 5A:
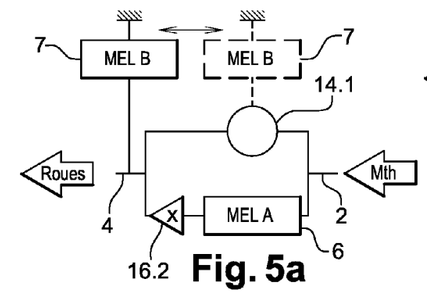
FIG. 5: kinematic diagrams of multi-mode transmissions according to the invention, equivalent to those in FIG. 3, comprising a single planetary gear train.

FIG. 5a thus shows a kinematic diagram of an architecture equivalent to that in FIG. 3a, in which the planetary gear train 14.2 connected to the machine 6 not responsible for switching modes is replaced with a rotating-rotor and -stator machine and a gear reduction 16.2. However, the gear train 14.1 responsible for changing modes, connected to the machine 7, is kept.

Figure 5B:
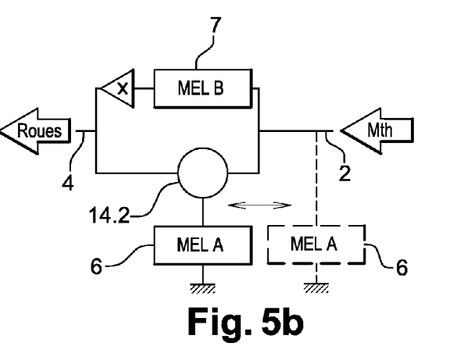

FIG. 5b shows a kinematic diagram of an architecture equivalent to that in FIG. 3b, in which the gear train 14.1 connected to the non-reconfigured machine 7 is replaced with a rotating-rotor and -stator machine 7. However, the gear train 14.2 connected to the machine 6, which enables mechanical synchronization during mode changes, is kept.

Figure 6A:
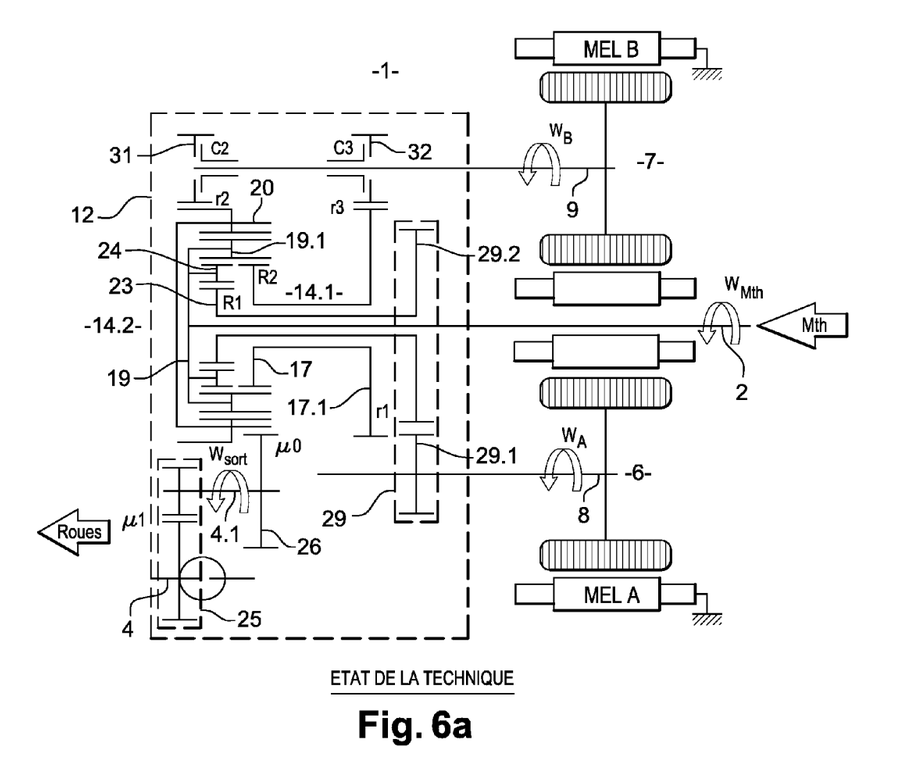
FIG. 6: schematic representations of a power transmission device with Ravigneaux gear trains, and its equivalents according to the invention.
Figure 6B:
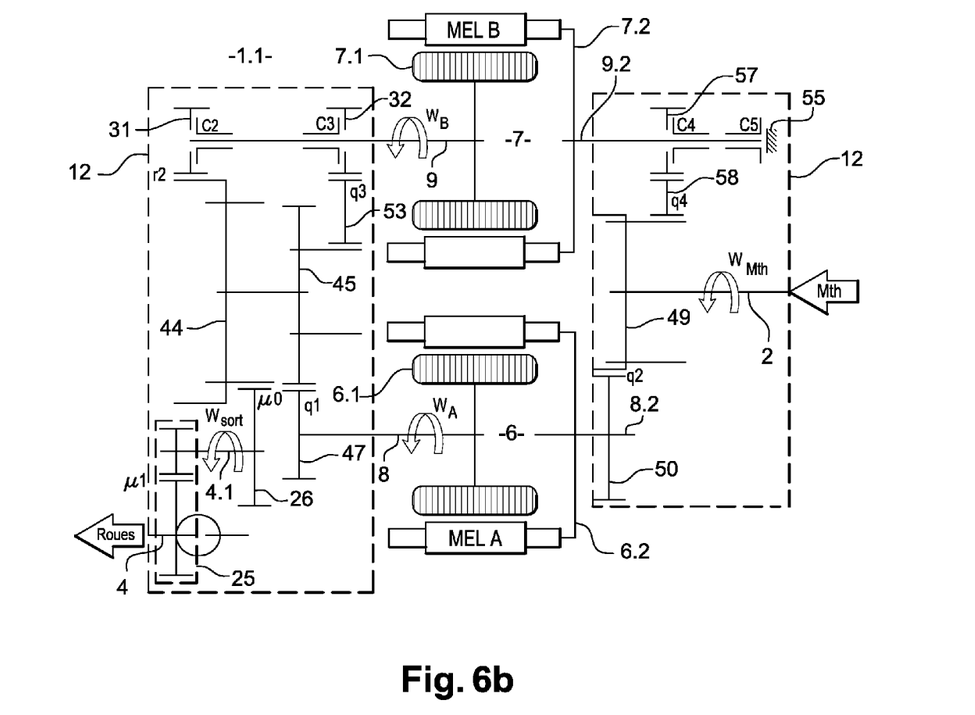
Figure 6C:
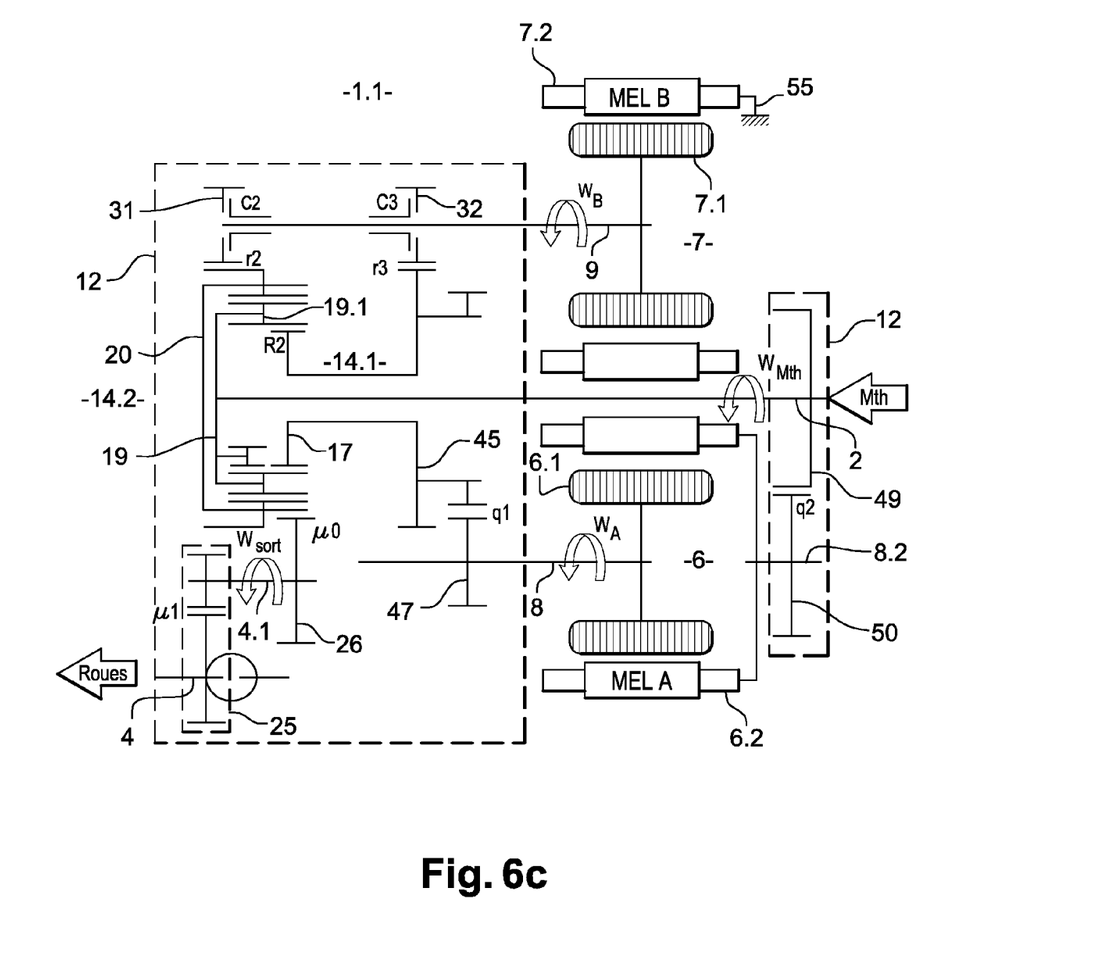

FIG. 6a shows a schematic representation of a prior art transmission device comprising a Ravigneaux gear train (the result of combining two planetary gear trains). FIGS. 6b and 6c show the respective equivalent transmissions according to the invention with no Ravigneaux gear train, or with a single planetary gear train.

The embodiment with no Ravigneaux gear train uses two rotating-stator and -rotor electric machines, whereas the embodiment with a single planetary gear train uses a conventional (fixed-stator) electric machine and a rotating-stator and -rotor electric machine.

More precisely, FIG. 6a shows a schematic representation of a conventional transmission device 1 comprising an input shaft 2 intended to be connected to a heat engine 3 and an output shaft 4 intended to be connected to the wheels 5.

This device 1 comprises a first electric machine 6 and a second electric machine 7 equipped with a shaft 8 and a shaft 9, respectively. For greater simplicity, the electrical system connecting the electric machines 6 and 7 to one another is not shown.

The input and output shafts 2, 4, and the shafts 8 and 9 are connected to one another via a mechanical assembly 12 shown enclosed within a dashed line.

This mechanical assembly 12 comprises a Ravigneaux-type gear train resulting from combining two planetary gear trains 14.1 and 14.2. The gear train 14.1, whose ratio is R2, has a sun gear 17, a planet carrier 19 carrying planet gears 19.1, and a ring gear 20 that intermesh. The gear train 14.2, whose ratio is R1, comprises a sun gear 23 and planet gears 24 carried by the planet carrier 19. The planet gears 24 mesh with the sun gear 23 and the planet gears 19.1. The gear train 14.2 has no ring gear.

In this embodiment, the input shaft 2 is connected to the planet carrier 19 shared by the two gear trains. The output shaft 4 is connected to the ring gear 20 via a differential 25 with a ratio of μ1 and a gear wheel 26. The gear reduction ratio between the ring gear and the gear wheel 26 is written as μ0.

Additionally, the shaft 8 is connected to the sun gear 23 via gear wheels 29.1 and 29.2, which between them form a gear assembly 29 with a gear reduction ratio r1.

The shaft 9 of the machine 7 is selectively connectable either to the ring gear 20 or to the first sun gear 17 via a gear wheel 17.1. To this end, the device 1 comprises a dog clutch C2 connectable to an idler gear 31, and a dog clutch C3 connectable to an idler gear 32. The dog clutches C2, C3 are rotationally driven by the shaft 9, and are translationally mobile in order to provide an angular connection between the shaft 9 and the idler gear 31, 32.

The idler gear 31 and the ring gear 20 form a gear assembly with a gear reduction ratio r2. The idler gear 32 and the gear wheel 17.1 form a gear assembly with a gear reduction ratio r3.

In a first operating mode of the coupled-output type (CO), the dog clutch C2 interlocks with the gear 31, while the dog clutch C3 is disengaged from the gear 32 and therefore is not transmitting any mechanical torque between the shafts 9 and 4, opposite.

In this mode CO, the rotational speeds Wa, Wb of the electric machines 6 and 7 are related to the rotational speeds of the wheels Wout and the heat engine Weng as expressed by the following equations:

$$Wa = -R1/(\mu 0 \cdot r1) \cdot Wout + (R1+1)/r1 \cdot Weng \quad (1)$$

$$Wb = 1/(\mu 0 \cdot r2) \cdot Wout \quad (2)$$

Thus, note that in CO mode, the rotational speed Wa of the machine 6 is dependent on the rotational speeds of the heat engine Weng and wheels Wout. The rotational speed Wb of the machine 7 is proportional to the rotational speed Wout of the wheels.

In the second, combined-type operating mode, the dog clutch C3 interlocks with the gear 32, while the dog clutch C2 is disengaged from the gear 31 and is therefore not transmitting any mechanical torque.

In this mode, the rotational speeds Wa, Wb of the electric machines 6, 7 are related to the rotational speeds of the wheels Wout and the heat engine Weng as expressed by the following equations:

$$Wa = -R1/(\mu 0 \cdot r1) \cdot Wout + (R1+1)/r1 \cdot Weng \quad (3)$$

$$Wb = -R2/(\mu 0 \cdot r3) \cdot Wout + (R2+1)/r3 \cdot Weng \quad (4)$$

Thus, note that in combined mode, the rotational speeds Wa and Wb of the machines 6, 7 are dependent on the rotational speeds of the heat engine Weng and wheels Wout.

In an example, R1=−2.07; R2=1.81; r1=−0.54; r2=−0.25; r3=−0.89; μ0=−0.15; μ1=−1.65

In practice, the mode is changed when the shaft 9 and the gears 31 and 32 have substantially the same rotation speed.

By assembling the architectures according to the invention so as to implement each of the various operating modes, a transmission device 1.1 as shown in FIG. 6b is obtained. This device 1.1 with no planetary gear trains corresponds to the embodiment in FIG. 4a.

The proportions of the electric machines 6, 7 are identical to those of the transmission in FIG. 6a. Moreover, the gear reductions μ0, μ1, r2 and the positioning of the shafts 8, 9 and the dog clutches C2, C3 are retained.

More precisely, the device 1.1 comprises a first electric machine 6 equipped with a rotating rotor 6.1 and stator 6.2, as well as a second electric machine 7 equipped with a rotating rotor 7.1 and stator 7.2.

The input shafts 2 and 4 and the shafts of the electric machines 6, 7 are connected to one another via a mechanical assembly 12 made up of a plurality of single gear wheels.

More precisely, the output shaft 4 is connected to an intermediate shaft 4.1 via a differential 25 with a ratio of μ1, this intermediate shaft 4.1 being connected in turn to the input shaft 2 via a gear assembly with a ratio μ0 made up of the gear wheels 44 and 26. The ratios μ0 and μ1 are identical to those in FIG. 6a.

In addition, the rotor shaft 8 of the machine 6 is connected to the gear wheel 45 via a gear wheel 47, and the gear reduction ratio between these two gear wheels is written as q1. The stator shaft 8.2 of the machine 6 is connected to the input shaft 2 via a gear assembly with a ratio q2 made up of the gear wheels 49 and 50.

The rotor shaft 9 of the machine 7 is selectively connectable to the shaft 4 via a gear assembly with a ratio r2, made up of the gear wheels 31 and 44, or via a gear assembly with a ratio q3 made up of the gear wheels 32, 53 and 45. To this end, the device 1 comprises a dog clutch C2 connectable to the idler gear 31, and a dog clutch C3 connectable to the idler gear 32.

In addition, the shaft 9.2 of the stator 7.2 of the machine 7 is selectively connectable to the housing 55 or to the input shaft 2 via a gear assembly with a ratio q4, made up of the idler gear 57 and the gear wheels 49 and 58. To this end, the device 1 comprises a dog clutch C5 connectable to the frame 55, and a dog clutch C4 connectable to the idler gear 57.

In CO mode, the dog clutches C2 and C5 are closed, with C3 and C4 open. The rotational speed Wa, Wb equations for the rotors of the machines 6, 7 are then:

$$Wa = 1/(\mu 0 \cdot q1) \cdot Wout - 1/q2 \cdot Weng \quad (5)$$

$$Wb = 1/(\mu 0 \cdot r1) \cdot Wout \quad (6)$$

In this mode, the rotational speed Wa of the rotor 6.1 of the machine 6 is dependent on the rotational speed of the input 2 and output 4 shafts; and the rotational speed Wb of the rotor 7.1 of the machine 7 is proportional to that of the output shaft 4 (that of the vehicle wheels).

In combined mode, the dog clutches C3 and C4 interlock respectively with the gears 32, 57; and the dog clutches C2 and C5 are disengaged from the gears 31 and 55, respectively. The rotational speed Wa, Wb equations for the rotors of the machines 6, 7 are then:

$$Wa = 1/(\mu 0 \cdot q1) \cdot Wout - 1/q2 \cdot Weng \quad (7)$$

$$Wb = 1/(\mu 0 \cdot q3) \cdot Wout - 1/q4 \cdot Weng \quad (8)$$

In this mode, the rotational speeds of the machines 6, 7 are dependent on the rotational speeds of the input 2 and output 4 shafts.

The new gear reductions q1 to q4 can be calculated with the equations (1) to (4), using identities:

$$q1 = -r1/R1 \quad (9)$$

$$q2 = -r1/(R1+1) \quad (10)$$

$$q3 = -r3/R2 \quad (11)$$

$$q4 = -r3/(R2+1) \quad (12)$$

According to the values for r1, r3, R1, R2 indicated previously, q1=−0.26; q2=−0.50; q3=0.49; q4=0.32.

During the transition between the two operating modes of the architecture in FIG. 6b, the rotor and the stator of the machine 7 are synchronized. This synchronization is achieved by appropriately controlling the electrical torque of this machine 7.

To switch from coupled-output mode to combined mode, then, the dog clutch C2 can be disengaged while keeping the dog clutch C5 engaged, for example, so that the machine 7 rotor is free. Then the rotational speed of the machine 7 rotor is synchronized with the gear 32 associated with the dog clutch C3, and then the dog clutch C3 is engaged. Then, the dog clutch C5 is disengaged, the rotational speed of the machine 7 stator is synchronized with the gear 57, and the dog clutch C4 is engaged with the gear 57.

Inversely, to switch from combined mode to coupled-output mode, one can disengage the dog clutch C4 and slow down the stator 9.2, for example. Once the stator 9.2 is stopped, the dog clutch C5 is engaged with the gear 55. Then the dog clutch C3 is opened, the rotational speed of the rotor 7.1 is synchronized with the gear 31, and the dog clutch C2 is engaged with the gear 31.

Note that the coupled-output mode which occurs during the mode change with C3 and C5 engaged and C2, C4 disengaged could be used independently of the other modes in specific vehicle situations such as starting off (where the vehicle goes from a zero speed to a non-zero speed), or starting up on an incline.

Moreover, another combined operating mode can be used, with the dog clutches C2 and C4 engaged and the dog clutches C3 and C5 disengaged. This operating mode can be used to optimize the operating points of the electric machines in certain scenarios, depending on the machine technology used, which has an influence on the most efficient zones.

In order to keep the proper mechanical synchronization of the machine 7 during the transition between the two modes, the kinematics shown in FIG. 6c are used, in which the transmission comprises only a single planetary gear train instead of the Ravigneaux-type double planetary gear train.

The proportions of the electric machines 6, 7 are identical to those of the transmission shown in FIG. 6a. The gear reductions μ0, μ1, r2 and r3 and the positioning of the shafts 2, 4, 8 and 9 and of the dog clutches C2, C3 are retained.

More precisely, the device 1.1 comprises a first electric machine 6 equipped with rotating rotor 6.1 and stator 6.2, as well as a second electric machine 7 with a rotating rotor 7.1 and a fixed stator 7.2.

The input and output shafts 2 and 4 and the shafts of the machines 6, 7 are connected to one another via a mechanical assembly 12 made up of the planetary gear train 14.1. This gear train 14.1, whose ratio is R2, has a sun gear 17, a planet carrier 19 carrying the planet gears 19.1, and a ring gear 20 that intermesh.

In this embodiment, the input shaft 2 is connected to the planet carrier 19. The output shaft 4 is connected to an intermediate shaft 4.1 via the differential 25, whose ratio is μ1. This intermediate shaft 4.1 is in turn connected to the ring gear 20 via a gear wheel 26. The ring gear 20 and the gear wheel 26 have a gear reduction ratio of μ0 between them. The ratios μ0 and μ1 are identical to those in FIG. 6a.

In addition, the rotor shaft 8 of the machine 6 is connected to the sun gear 17 via a gear assembly with a ratio of q1, made up of the gear wheels 45 and 47. The stator shaft 8.2 of the machine 6 is connected to the input shaft 2 via a gear assembly with a ratio of q2, made up of the gear wheels 49 and 50.

The shaft 9 of the machine 7 is selectively connectable either to the ring gear 20 or to the first sun gear 17. To this end, the device 1.1 comprises a dog clutch C2 connectable to an idler gear 31, and a dog clutch C3 connectable to an idler gear 32.

The idler gear 31 and the ring gear 20 make up a gear assembly with a gear reduction ratio of r2. The idler gear 32 and the gear wheel 45 make up a gear assembly with a gear reduction ratio of r3.

In the coupled-output (CO) type of operating mode, the dog clutch C2 interlocks with the gear 31, while the dog clutch C3 is disengaged from the gear 32. The rotational speed Wa, Wb equations for the rotors of the machines 6, 7 are then:

$$Wa = 1/(\mu 0 \cdot q1) \cdot Wout - 1/q2 \cdot Weng \quad (13)$$

$$Wb = 1/(\mu 0 \cdot r2) \cdot Wout \quad (14)$$

In this mode, the rotational speed Wa of the rotor 6.1 of the machine 6 is dependent on the rotational speeds of the input 2 and output 4 shafts; and the rotational speed Wb of the machine 7 is proportional to that of the output shaft 4 (that of the vehicle wheels).

In combined mode, the dog clutch C3 interlocks with the gear 32, while the dog clutch C2 is disengaged from the gear 31. The rotational speed Wa, Wb equations for the rotors of the machines 6, 7 are then:

$$Wa = 1/(\mu 0 \cdot q1) \cdot Wout - 1/q2 \cdot Weng \quad (15)$$

$$Wb = -R2/(\mu O \cdot r3) \cdot Wout + (R2+1)/r3 \cdot Weng \quad (16)$$

In this mode, the rotational speeds of the rotors of the machines 6, 7 are dependent on the rotational speeds of the input 2 and output 4 shafts.

The gear reductions q1 and q2 are identical to those previously calculated, respectively:

$$q1 = -r1/R1 \quad (17)$$

$$q2 = -r1/(R1+1) \quad (18)$$

According to the values r1 and R1 indicated previously, q1=−0.26 and q2=−0.50.

Just as for the architecture in FIG. 6a, the mode is changed when the shaft 9 and the gears 31 and 32 have substantially the same rotation speed.

The dog clutches are displaced in a conventional manner, using forks.

The invention claimed is:

1. Power transmission device comprising:
an input shaft intended to be connected to a heat engine, and an output shaft intended to be connected to a wheel shaft,
a first and a second electric machine respectively comprising a stator and a rotor, each machine respectively being equipped with a shaft, and
a mechanical assembly providing the mechanical connection between the input shaft, the output shaft, and the shafts of the machines, wherein
at least one of the electric machines comprises a rotating rotor and a rotating stator each directly connected to the mechanical assembly, and
the device comprises a switching device mounted on the shaft of one of the electric machines, this switching device enabling the shaft of the machine to be selectively and directly connected to two different elements of the mechanical assembly in order to change an operating mode of the power transmission device.

2. Device according to claim 1, wherein:
the rotational speed of the electric machine that carries the switching device is proportional solely to the rotational speed of a plurality of wheels or of the engine when the shaft of said machine is connected to one of the two elements of the mechanical assembly, and
the rotational speed of the electric machine that carries the switching device is dependent on the rotational speeds of the wheels and of the engine when the shaft of the machine (6,7) is connected to another element of the mechanical assembly.

3. Device according to claim 2, wherein both electric machines have rotating stators, and the mechanical assembly does not include a planetary gear train.

4. Device according to claim 2, wherein one of the machines has a rotating stator and the other has a fixed stator, and the mechanical assembly comprises only one planetary gear train, made up of a sun gear, a planet carrier with planet gears, and a ring gear that intermesh.

5. Device according to claim 4, wherein the input shaft is directly connected to the planet carrier, and the output shaft is connected to an intermediate shaft via a differential with a ratio of μ1, said intermediate shaft being connected to the ring gear via a first gear assembly with a ratio of μ0.

6. Device according to claim 5, wherein the shaft of the machine with the fixed stator is selectively connectable to the ring gear via a second gear assembly with a ratio of r2, or to the sun gear via a third gear assembly with a ratio of r3.

7. Device according to claim 1, wherein both electric machines have rotating stators, and the mechanical assembly does not include a planetary gear train.

8. Device according to claim 7, wherein the output shaft is connected to an intermediate shaft via a differential with a ratio of μ1, said intermediate shaft being connected to the input shaft via a first gear assembly with a ratio of μ0.

9. Device according to claim 8, wherein the rotor of the first machine is connected to a plurality of wheels via a second gear assembly with a ratio of q1, and the stator of this machine is connected to the input shaft via a third gear assembly with a ratio of q2.

10. Device according to claim 9, wherein the rotor of the second machine is selectively connectable to the output shaft via a fourth gear assembly with a ratio of r2 or via a fifth gear assembly with a ratio of q3, respectively by means of a first dog clutch and a second dog clutch, and
the stator of the second machine is selectively connectable to the input shaft via a sixth gear assembly with a ratio of q4 or to a fixed frame, respectively by means of a third dog clutch and a fourth dog clutch.

11. Device according to claim 10, wherein μ0=−0.15; μ1=−1.65; r2=−0.25; r3=−0.89; q1=−0.26; q2=−0.50; q3=0.49; q4=0.32.

12. Device according to claim 1 wherein one of the machines has a rotating stator and the other has a fixed stator, and the mechanical assembly comprises only one planetary gear train, made up of a sun gear, a planet carrier with planet gears, and a ring gear that intermesh.

13. Device according to claim 12, wherein the input shaft is directly connected to the planet carrier, and the output shaft is connected to an intermediate shaft via a differential with a ratio of $\mu 1$, said intermediate shaft being connected to the ring gear via a first gear assembly with a ratio of $\mu 0$.

14. Device according claim 13, wherein the shaft of the machine with the fixed stator is selectively connectable to the ring gear via a second gear assembly with a ratio of r2, or to the sun gear via a third gear assembly with a ratio of r3.

15. Device according to claim 14, wherein the stator of the machine with the rotating stator is connected to the input shaft via a fourth gear assembly with a ratio of q2, and the rotor of the machine with the rotating stator is connected to the sun gear via a fifth gear assembly with a ratio of q1.

16. Device according claim 15, wherein $\mu 0 = -0.15$; $\mu 1 = -1.65$; r2=−0.25; r3=−0.89; q1=−0.26; q2=−0.50.

17. Device according to claim 12, wherein the shaft of the machine with the fixed stator is selectively connectable to the ring gear via a first gear assembly with a ratio of r2, or to the sun gear via a second gear assembly with a ratio of r3.

18. Method of transmitting power using the device according to claim 10, comprising:
switching the switching device so as to change between the operating mode of the power transmission device and other operating modes of the power transmission device, wherein the operating modes include:
a coupled-output mode of the power transmission device, wherein the first and fourth dog clutches are closed, and the second and third dog clutches are opened, and
a combined mode of the power transmission device, wherein the second and third dog clutches are closed, and the first and fourth dog clutches are opened.

19. Method according to claim 18, comprising, in order to change from the coupled-output mode to the combined mode:
disengaging the first dog clutch while the fourth dog clutch remains engaged,
synchronizing a rotational speed of the rotor of the second machine with a first idler gear connectable to the second dog clutch,
then engaging the second dog clutch,
disengaging the fourth dog clutch,
synchronizing the rotational speed of the stator of the second machine with a second idler gear connectable to the third dog clutch, and
engaging the third dog clutch with this gear.

20. Method according to claim 18, comprising, in order to change from the combined mode to the coupled-output mode:
disengaging the third dog clutch,
stopping the stator of the second machine,
engaging the fourth dog clutch with the frame,
opening the second dog clutch,
synchronizing the rotor of the second machine with an idler gear connectable to the first dog clutch, and
engaging the first dog clutch with the idler gear.

* * * * *